(12) United States Patent
Liu et al.

(10) Patent No.: US 12,021,641 B2
(45) Date of Patent: Jun. 25, 2024

(54) DATA RETRANSMISSION INDICATION AND PROCESSING METHOD AND DEVICE

(71) Applicant: ZTE Corporation, Shenzhen (CN)

(72) Inventors: Zhuang Liu, Shenzhen (CN); Yin Gao, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 428 days.

(21) Appl. No.: 17/415,982

(22) PCT Filed: Dec. 20, 2019

(86) PCT No.: PCT/CN2019/126954
§ 371 (c)(1),
(2) Date: Jun. 18, 2021

(87) PCT Pub. No.: WO2020/135251
PCT Pub. Date: Jul. 2, 2020

(65) Prior Publication Data
US 2021/0385031 A1    Dec. 9, 2021

(30) Foreign Application Priority Data

Dec. 24, 2018   (CN) .......................... 201811585254.9

(51) Int. Cl.
*H04L 1/1867* (2023.01)
*H04L 1/1829* (2023.01)
(Continued)

(52) U.S. Cl.
CPC .......... *H04L 1/1896* (2013.01); *H04L 1/1835* (2013.01); *H04L 1/1874* (2013.01); *H04W 28/06* (2013.01); *H04W 76/12* (2018.02)

(58) Field of Classification Search
CPC ... H04L 1/1835; H04L 1/1874; H04L 1/1896; H04W 28/06; H04W 76/12
See application file for complete search history.

(56) References Cited

U.S. PATENT DOCUMENTS 7,957,430 B2 * 6/2011 Kashima ............. H04W 28/065
                                                  370/914
11,271,699 B1 * 3/2022 Eyuboglu ............ H04B 7/0691
(Continued)

FOREIGN PATENT DOCUMENTS

CN      103888215 A    6/2014
CN      108282292 A    7/2018
(Continued)

OTHER PUBLICATIONS

International Search Report for corresponding application PCT/CN2019/126954 filed Dec. 20, 2019; dated Mar. 19, 2020.
(Continued)

*Primary Examiner* — Melanie Jagannathan
(74) *Attorney, Agent, or Firm* — CANTOR COLBURN LLP

(57) ABSTRACT

Provided are a data retransmission indication and processing method and device. The data retransmission indication method includes: a first network element sends a retransmission indication message to a retransmission network element, the retransmission indication message being used to instruct the retransmission network element to retransmit segment data of a Packet Data Convergence Protocol (PDCP) Protocol Data Unit (PDU), which fails to transmit by the first network element, to a terminal.

19 Claims, 9 Drawing Sheets

A first network element sends a retransmission indication message to a retransmission network element, the retransmission indication message being used to instruct the retransmission network element to retransmit segment data of a PDCP PDU, which fails to transmit by the first network element, to a terminal — S102

(51) Int. Cl.
*H04W 28/06* (2009.01)
*H04W 76/12* (2018.01)

(56) References Cited

U.S. PATENT DOCUMENTS

| | | | | |
|---|---|---|---|---|
| 11,477,703 | B2* | 10/2022 | Xu | H04W 76/11 |
| 2009/0046631 | A1* | 2/2009 | Meylan | H04W 80/02 |
| | | | | 370/328 |
| 2014/0056219 | A1* | 2/2014 | Ye | H04L 69/16 |
| | | | | 370/328 |
| 2015/0146614 | A1* | 5/2015 | Yu | H04W 72/23 |
| | | | | 370/328 |
| 2016/0302105 | A1* | 10/2016 | Damnjanovic | H04W 28/065 |
| 2018/0097918 | A1* | 4/2018 | Nuggehalli | H04L 69/166 |
| 2018/0132135 | A1 | 5/2018 | Shi | |
| 2018/0234839 | A1* | 8/2018 | Tenny | H04W 36/0033 |
| 2018/0302821 | A1* | 10/2018 | Gustafsson | H04L 1/188 |
| 2019/0059039 | A1* | 2/2019 | Centonza | H04W 76/19 |
| 2019/0150217 | A1* | 5/2019 | Kim | H04L 1/1809 |
| | | | | 370/329 |
| 2020/0029390 | A1* | 1/2020 | Han | H04W 28/06 |
| 2020/0245184 | A1* | 7/2020 | Jin | H04L 69/22 |
| 2020/0351711 | A1* | 11/2020 | Kim | H04W 72/23 |
| 2021/0092667 | A1* | 3/2021 | Zhu | H04W 40/24 |
| 2021/0153086 | A1* | 5/2021 | Kim | H04W 36/08 |
| 2021/0227428 | A1* | 7/2021 | Bae | H04W 36/0069 |
| 2021/0274381 | A1* | 9/2021 | Teyeb | H04L 1/1854 |
| 2021/0392085 | A1* | 12/2021 | Han | H04L 1/1642 |
| 2023/0147845 | A1* | 5/2023 | Teyeb | H04L 1/1887 |
| | | | | 370/328 |
| 2023/0164871 | A1* | 5/2023 | Jung | H04W 12/0433 |
| | | | | 370/328 |

FOREIGN PATENT DOCUMENTS

| | | |
|---|---|---|
| CN | 108282824 A | 7/2018 |
| CN | 108282825 A | 7/2018 |
| CN | 108307437 A | 7/2018 |
| CN | 108631961 A | 10/2018 |
| WO | 2018169462 A1 | 9/2018 |
| WO | 2018171775 A1 | 9/2018 |

OTHER PUBLICATIONS

CATT, Response to R3-171171, 3GPP TSG-RAN WG3 Meeting #95BIS Spokane, USA, Apr. 3-7, 2017, R3-171259.

Ericsson, CMCC, Description of solutions for centralised retransmission with Option 2, 3GPP TSG-RAN WG3 Meeting #95bis, Spokane, USA, Apr. 3-7, 2017, R3-171169.

European Search Report for corresponding application EP19903703; dated Feb. 2, 2022.

Huawei, HiSilicon, L2 Reordering and Retransmission Functions, 3GPP TSG-RAN WG2 Meeting #95, Gothenburg, Sweden, Aug. 22-26, 2016, R2-165022.

* cited by examiner

A first network element sends a retransmission indication message to a retransmission network element, the retransmission indication message being used to instruct the retransmission network element to retransmit segment data of a PDCP PDU, which fails to transmit by the first network element, to a terminal ⌒ S102

DATA RETRANSMISSION INDICATION AND PROCESSING METHOD AND DEVICE

CROSS-REFERENCE TO RELATED APPLICATIONS

The present disclosure claims priority to Chinese Patent Application No. 201811585254.9, filed to the China Patent Office on Dec. 24, 2018, the disclosure of which is hereby incorporated by reference in its entirety.

TECHNICAL FIELD

The present disclosure relates, but is not limited, to the field of communications.

BACKGROUND

In a 5 Generation (5G) mobile communication system, a 5G base station is called a New Generation Radio Access Network Node (NG RAN Node (gNB)). An interface between gNBs is called an Xn interface, and an interface between a gNB and another non-5G base stations is an X2 interface. The 5G base station supports a Central Unit (CU)/Distributed Unit (DU) separation architecture. A separate 5G base station may be divided into a CU and a DU. A Service Data Adaptation Protocol (SDAP) and Packet Data Convergence Protocol (PDCP) entities of the base station are located in the CU, a Radio Link Control (RLC)/Media Access Control (MAC)/Physical (PHY) protocol entity of the base station is located in the DU, and the CU and the DU are connected through an F1 interface.

Only one gNB-CU inside a separate 5G base station acts as a central control node. A gNB-CU may connect and manage multiple gNB-DUs. A gNB-DU is connected to a gNB-CU through the F1 interface. A gNB may be connected to other gNBs through an Xn interface, and a gNB may be connected to an LTE NodeB through the X2 interface. The F1/Xn/X2 interface may be distinguished into an F1-C/Xn-C/X2-C control plane interface for transmitting control plane information, and an F1-U/Xn-U/X2-U user plane interface for transmitting user plane data. And F1-U/Xn-U/X2-U may be collectively referred to as an NR-U interface.

SUMMARY

According to embodiments of the present disclosure, a data retransmission indication method is provided, which may include that: a first network element sends a retransmission indication message to a retransmission network element, the retransmission indication message being used to instruct the retransmission network element to retransmit PDCP Protocol Data Unit (PDU) segment data, which fails to transmit by the first network element, to a terminal.

According to embodiments of the present disclosure, a data retransmission processing method is provided, which may include that: a retransmission network element receives a retransmission indication message sent by a first network element; and the retransmission network element retransmits segment data of a PDCP PDU, which fails to transmit by the first network element, to a terminal according to the retransmission indication message.

According to embodiments of the present disclosure, a data retransmission indication device is provided, which may be located in a first network element and may include: a sending module, configured to send a retransmission indication message to a retransmission network element, the retransmission indication message being used to instruct the retransmission network element to retransmit segment data of a PDCP PDU, which fails to transmit by the first network element, to a terminal.

According to embodiments of the present disclosure, a data retransmission processing device is provided, which may be located in a retransmission network element and may include: a receiving module, configured to receive a retransmission indication message sent by a first network element; and a processing module, configured to retransmit segment data of a PDCP PDU, which fails to transmit by the first network element, to a terminal according to the retransmission indication message.

According to another embodiment of the present disclosure, a storage medium is also provided, which may have a computer program stored therein. When the computer program is run by a processor, the processor may be caused to perform the data retransmission indication method according to the present disclosure.

According to another embodiment of the present disclosure, a storage medium is also provided, which may have a computer program stored therein. When the computer program is run by a processor, the processor may be caused to perform the data retransmission processing method according to the present disclosure.

According to another embodiment of the present disclosure, an electronic device is also provided, which may include a memory and a processor. The memory may store a computer program. The processor may be configured to run the computer program to perform the data retransmission indication method according to the present disclosure.

According to another embodiment of the present disclosure, an electronic device is also provided, which may include a memory and a processor. The memory may store a computer program. The processor may be configured to run the computer program to perform the data retransmission processing method according to the present disclosure.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings.

DETAILED DESCRIPTION OF THE EMBODIMENTS

Figures 1, 2:
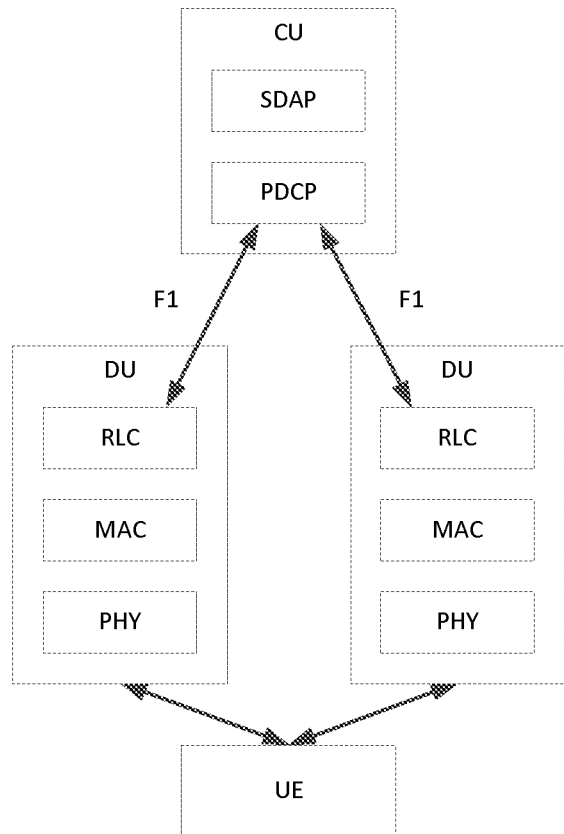
FIG. 1 is a flowchart of a data retransmission indication method according to an embodiment of the present disclosure.
FIG. 2 is a schematic diagram of a data transmission system according to an embodiment of the present disclosure.

The present disclosure is described below with reference to the drawings and in conjunction with the embodiments in detail. It is to be noted that embodiments in the present application and characteristics in the embodiments may be combined under the condition of no conflicts.

It is to be noted that the specification and claims of the disclosure and the terms "first", "second" and the like in the drawings are used to distinguish similar objects, and do not need to describe a specific sequence or a precedence order.

In order to provide a higher rate for a user, an existing wireless networking technology supports connection of a terminal with multiple DUs in a base station, and the terminal may simultaneously transmit and receive data from two or more DUs.

For the existing CU/DU higher-layer separation scheme, PDCP or above entities of the base station are placed in a CU, and RLC or below entities of the base station are placed in a DU. When a terminal is connected to multiple DUs under a base station, downlink PDCP PDU data may be distributed to two or more DUs for transmission to the terminal for a CU entity of the base station. In the process of data transmission, if a transitory link quality outage of a terminal service connection occurs to a certain DU, in order to reduce data transmission delay and packet loss, the DU needs to send an OUTAGE message to a CU through an F1-U interface, the OUTAGE message carrying a maximum PDCP Sequence Number (SN) in which the DU has been successfully continuously sent. After the CU receives the OUTAGE message of the DU, it may judge which PDCP PDUs sent to the DU have not been successfully sent by the DU through the "maximum PDCP SN" carried in the OUTAGE message, so that the CU may send this unsuccessfully sent PDCP PDU data to another DU for transmission to the terminal.

At present, for the PDCP PDU transmission in an NR system, the PDCP PDU may be divided into several PDCP PDU segments for transmission in the transmission process. Each PDCP PDU segment is an RLC PDU, and RLC PDUs belonging to the same PDCP PDU have the same RLC SN.

However, the CU can only retransmit the entire unsuccessfully transmitted PDCP PDU of a certain DU to other DUs for retransmission. For a retransmitted PDCP PDU, it is possible that some segments (i.e., RLC PDUs) in the PDCP PDU have been successfully transmitted to the terminal at the RLC entity of the original DU, and retransmitting the entire PDCP PDU results in redundant retransmission of the successfully transmitted RLC PDU data in the PDCP PDU.

In addition, a base station dual connection technology is supported in a wireless communication technology, i.e., one terminal may maintain connection with two or more base stations, and service bearer data of one terminal may be distributed to two or more base stations for transmission. The base station where a PDCP entity is located is used for receiving terminal service bearer data issued by a core network, the base station where an RLC entity is located is used for receiving terminal service bearer data distributed by the base station where the PDCP entity is located, and it is possible that the base station where one or more RLC entities are located is used for receiving terminal service bearer data distributed by the base station where the PDCP is located. A user terminal and multiple base stations are simultaneously connected.

A base station multi-connection technology is adopted. In the data transmission process, if a terminal service connection "outage" occurs to a base station (i.e. distribution base station) where the RLC is located, in order to reduce data transmission delay and packet loss, the base station where the RLC is located needs to send an OUTAGE message to a base station where the PDCP is located through an X2-U/Xn-U interface, the OUTAGE message carrying a maximum PDCP SN in which the base station where the RLC is located has been successfully continuously sent. After the base station where the PDCP is located receives the OUTAGE message, it may judge which PDCP PDUs sent to the base station where the RLC is located have not been successfully sent by the base station through the "maximum PDCP SN" carried in the OUTAGE message, so that the base station where the PDCP is located may send this unsuccessfully sent PDCP PDU data to the present base station with normal link quality or another connected base station for sending, so that the data sending delay and the packet loss can be reduced.

However, the base station where the PDCP is located can only retransmit the entire certain unsuccessfully transmitted PDCP PDU to other base stations for retransmission. For a retransmitted PDCP PDU, it is possible that some segments (i.e., RLC PDUs) in the PDCP PDU have been successfully transmitted to the terminal, and retransmitting the entire PDCP PDU results in redundant retransmission of the successfully transmitted RLC PDU data in the PDCP PDU. At present, nodes for providing distributed data are all nodes (CUs or base stations) where the PDCP is located, and nodes for distributed data transmission are all nodes (DUs or base stations) where the RLC is located.

Therefore, in the multi-connection technology, when the node where the PDCP is located retransmits data, there is a problem of retransmitting RLC PDU data which has been successfully transmitted. Meanwhile, not only in a multi-connection scenario, if a User Equipment (UE) is switched from a source DU to a target DU, or the UE is switched from a source base station to a target base station, PDCP PDU data which is not successfully transmitted by a source network element (DU or base station) needs to be retransmitted on a target network element. Similarly, for a retransmitted PDCP PDU, it is possible that some segments (i.e., RLC PDUs) in the PDCP PDU have been successfully transmitted to the terminal, and retransmitting the entire PDCP PDU results in redundant retransmission of the successfully transmitted RLC PDU data in the PDCP PDU.

The embodiments of the present disclosure provide a data retransmission indication method. FIG. 1 is a flowchart of a data retransmission indication method according to an embodiment of the present disclosure. As shown in FIG. 1, the flow includes step S102 below.

In step S102, a first network element sends a retransmission indication message to a retransmission network element, the retransmission indication message being used to instruct the retransmission network element to retransmit segment data of a PDCP PDU, which fails to transmit by the first network element, to a terminal.

In an embodiment, the retransmission network element includes at least one of the following: a second network element and a third network element, the first network element and the third network element are DUs or base stations where RLC entities are located, and the second network element is a CU or a base station where a PDCP entity is located.

Specifically, FIG. 2 is a schematic diagram of a data transmission system according to an embodiment of the present disclosure. As shown in FIG. 2, since the base station and the CU or the base station and the DU may be separated, the first network element and the third network element may be either the base station or the DU, and the second network element may be either the base station or the CU.

It is further to be noted that multiple DUs may interact by establishing a connection, so that the first network element may establish a connection with the third network element (e.g., through X2/Xn) and send a retransmission indication message directly to the third network element without forwarding through the second network element.

Figure 3:
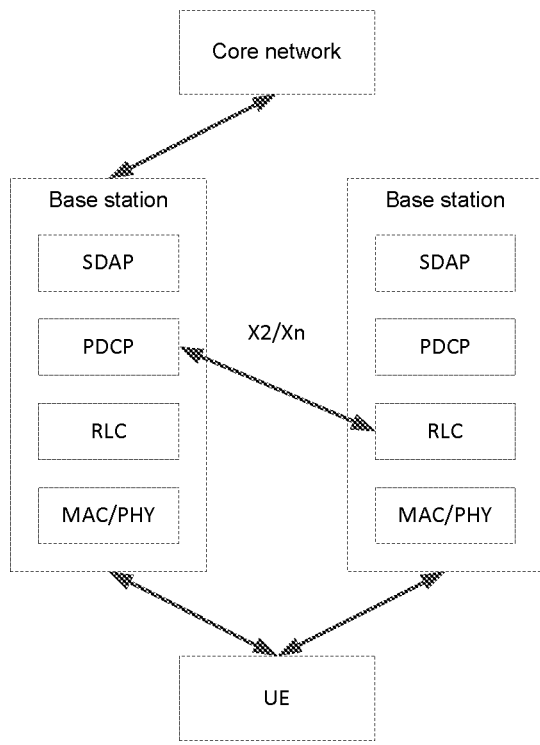
FIG. 3 is a schematic diagram of another data transmission system according to an embodiment of the present disclosure.

FIG. 3 is a schematic diagram of another data transmission system according to an embodiment of the present disclosure. As shown in FIG. 3, the CU or the DU is located in the base station. Therefore, the first network element and the third network element are base stations where RLC entities are located, and the second network element is a base station where a PDCP entity is located.

It is to be noted that FIG. 3 illustrates, by way of example only, a connection mode of a terminal to two base stations, and a connection mode of three or even more base stations is within the scope of protection of the present disclosure. Therefore, the first network element may be connected to the second network element and the third network element through X2/Xn. Therefore, the first network element may establish a connection with the third network element (e.g., through X2/Xn) and send a retransmission indication message directly to the third network element without forwarding through the second network element.

It is further to be noted that FIGS. 2 and 3 illustrate, by way of example only, two different data transmission systems. Any data transmission system capable of applying the method according to the embodiments of the present disclosure is within the scope of protection of the present disclosure. The descriptions are omitted herein.

In an embodiment, the retransmission indication message includes: a first retransmission indication message, used to instruct the second network element or the third network element to retransmit the segment data of the PDCP PDU, which fails to transmit by the first network element, to the terminal.

In an embodiment, the first retransmission indication message includes: a first message, which includes at least one of the following: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit.

Specifically, the PDCP segment retransmission indication may be a field carried in the first retransmission indication message. The field is dedicated to instructing the second network element or the third network element to retransmit the segment data of the PDCP PDU, which fails to transmit by the first network element, to the terminal after receiving the first retransmission indication message.

In an embodiment, the first retransmission indication message further includes: a second message, which is used to indicate an RLC entity state of the first network element and includes at least one of the following: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In an embodiment, the method further includes that: when receiving a first retransmission indication response message returned by the retransmission network element, the first network element encapsulates RLC PDU data corresponding to segment data of a PDCP PDU which fails to transmit into format-specified data, and sends the data to the retransmission network element; or, when receiving a first retransmission indication response message returned by the retransmission network element, the first network element encapsulates RLC PDU data in a sending buffer and a receiving buffer in an RLC entity into format-specified data, and sends the data to the retransmission network element. The first retransmission indication response message is used to indicate that the first retransmission indication message lacks the segment data of the PDCP PDU which fails to transmit or the segment data of the PDCP PDU which fails to transmit is incomplete.

In an embodiment, the method further includes that: when the first network element detects that the first retransmission indication message lacks the segment data of the PDCP PDU which fails to transmit, the first network element encapsulates RLC PDU data corresponding to the segment data of the PDCP PDU which fails to transmit into format-specified data, and sends the data to the retransmission network element; or, when the first network element detects that the first retransmission indication message lacks the segment data of the PDCP PDU which fails to transmit, the first network element encapsulates RLC PDU data in a sending buffer and a receiving buffer in an RLC entity into format-specified data, and sends the data to the retransmission network element.

In an embodiment, the format-specified data at least includes: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

Through the description of the above implementation manners, those skilled in the art can clearly understand that the method according to the above embodiment may be implemented by means of software plus a necessary general hardware platform, and of course, may also be implemented through hardware. Based on such understanding, the technical solution of the present disclosure may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

Figure 4:
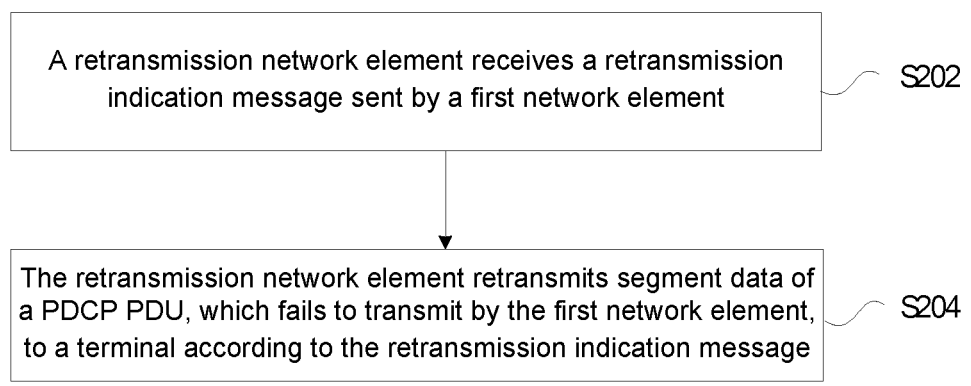
FIG. 4 is a flowchart of a data retransmission processing method according to an embodiment of the present disclosure.

A data retransmission processing method is provided in the embodiments of the present disclosure. FIG. 4 is a flowchart of a data retransmission processing method according to an embodiment of the present disclosure. As shown in FIG. 4, the flow includes steps S402 to S404 below.

In step S402, a retransmission network element receives a retransmission indication message sent by a first network element.

In step S404, the retransmission network element retransmits segment data of a PDCP PDU, which fails to transmit by the first network element, to a terminal according to the retransmission indication message.

In an embodiment, the retransmission network element includes at least one of the following: a second network element and a third network element, the first network element and the third network element are DUs or base stations where RLC entities are located, and the second network element is a CU or a base station where a PDCP entity is located.

Specifically, the first network element, the second network element and the third network element may be applicable but are not limited to the data transmission systems described in FIGS. 2 and 3.

In an embodiment, the retransmission indication message includes: a first retransmission indication message, used to instruct the second network element or the third network element to retransmit the segment data of the PDCP PDU, which fails to transmit by the first network element, to the terminal; or, a second retransmission indication message, used to instruct the second network element to retransmit the segment data of the PDCP PDU to the terminal through the third network element.

In an embodiment, the first retransmission indication message includes: a first message, which includes at least one of the following: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit.

In an embodiment, the first retransmission indication message further includes: a second message, which is used to indicate an RLC entity state of the first network element and includes at least one of the following: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In an embodiment, the second retransmission indication message includes at least one of the following: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit or the PDCP PDU which fails to transmit.

Similar to the foregoing embodiments, the PDCP segment retransmission indication may be a field carried in the first retransmission indication message. The field is dedicated to instructing the third network element to retransmit the segment data of the PDCP PDU to the terminal after instructing the second network element to receive the first retransmission indication message.

In an embodiment, the method further includes that: after the retransmission network element returns a first retransmission indication response message to the first network element, the retransmission network element receives format-specified data sent by the first network element. The format-specified data is encapsulated with: RLC PDU data corresponding to segment data of a PDCP PDU which fails to transmit; or, RLC PDU data in a sending buffer and a receiving buffer in an RLC entity. The first retransmission indication response message is used to indicate that the first retransmission indication message lacks the segment data of the PDCP PDU which fails to transmit or the segment data of the PDCP PDU which fails to transmit is incomplete.

In an embodiment, the method further includes that: the retransmission network element receives a detection message and format-specified data sent by the first network element. The detection message is used to indicate that the first retransmission indication message lacks the segment data of the PDCP PDU which fails to transmit. The format-specified data is encapsulated with: RLC PDU data corresponding to segment data of a PDCP PDU which fails to transmit; or, RLC PDU data in a sending buffer and a receiving buffer in an RLC entity.

In an embodiment, the method further includes that: when receiving a second retransmission indication response message returned by the third network element, the second network element sends the first retransmission indication message to the third network element; or, when receiving a second retransmission indication response message returned by the third network element, the second network element encapsulates RLC PDU data corresponding to segment data of a PDCP PDU which fails to transmit into format-specified data, and sends the data to the third network element; or, when receiving a second retransmission indication response message returned by the third network element, the second network element encapsulates RLC PDU data in a sending buffer and a receiving buffer in an RLC entity into format-specified data, and sends the data to the third network element. The second retransmission indication response message is used to indicate that the second retransmission indication message lacks the segment data of the PDCP PDU which fails to transmit or the segment data of the PDCP PDU which fails to transmit is incomplete.

In an embodiment, the method further includes that: when detecting that the second retransmission indication message lacks the segment data of the PDCP PDU which fails to transmit, the second network element sends the first retransmission indication message to the third network element; or, when detecting that the second retransmission indication message lacks the segment data of the PDCP PDU which fails to transmit, the second network element encapsulates RLC PDU data corresponding to the segment data of the PDCP PDU which fails to transmit into format-specified data, and sends the data to the third network element; or, when detecting that the second retransmission indication message lacks the segment data of the PDCP PDU which fails to transmit, the second network element encapsulates RLC PDU data in a sending buffer and a receiving buffer in an RLC entity into format-specified data, and sends the data to the third network element.

In an embodiment, when receiving the second retransmission indication message and format-specified data, the retransmission network element retransmits the segment data of the PDCP PDU to the terminal through the third network element by using the second retransmission indication message.

In an embodiment, the format-specified data at least includes: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In an embodiment, the method further includes that: when the retransmission network element fails to retransmit, the retransmission network element performs segmentation and reassembly on the segment data of the PDCP PDU which fails to transmit to generate a format RLC PDU, and sends the format RLC PDU to the terminal.

In an embodiment, an RLC header of the format RLC PDU includes at least one of the following: an OLD LCID, an OLD RLC SN, and an OLD cell group identifier. The OLD LCID is used to identify a logical channel identifier where the first network element transmits the segment data of the PDCP PDU. The OLD RLC SN is used to identify an RLC PDU SN allocated for the first network element to transmit the segment data of the PDCP PDU. The OLD cell group identifier is used to identify a cell group identifier of a logical channel where the first network element transmits the segment data of the PDCP PDU.

In an embodiment, the format RLC PDU is used to instruct an RLC entity in the terminal to forward the received RLC PDU to an RLC entity where a logical channel corresponding to the OLD LCID and/or the OLD cell group identifier in the RLC PDU header is located.

In an embodiment, when the third network element fails to retransmit, the second network element performs segmentation and reassembly on the segment data of the PDCP PDU which fails to transmit to generate a format MAC PDU, and sends the format MAC PDU to the terminal.

In an embodiment, an MAC header or MAC CE of the format MAC PDU includes at least one of the following: an OLD LCID and an OLD cell group identifier. The OLD LCID is used to identify a logical channel identifier where the first network element transmits the segment data of the PDCP PDU the OLD cell group identifier is used to identify a cell group identifier of a logical channel where the first network element transmits the segment data of the PDCP PDU.

In an embodiment, the format MAC PDU is used to instruct the terminal to forward the received RLC PDU encapsulated in the MAC PDU to an RLC entity where a logical channel corresponding to the OLD LCID and/or the OLD cell group identifier in the MAC header or the MAC CE is located.

In an embodiment, the method further includes that: when receiving the format-specified data, the second network element synchronizes an RLC entity in the first network element to an RLC entity in the second network element according to the second message.

In an embodiment, the method further includes that: when receiving the format-specified data, the second network element sends a synchronization message to the third network element; and the second network element forwards the format-specified data to the third network element. The synchronization message is used to instruct the third network element to synchronize the RLC entity of the first network element.

In an embodiment, the synchronization message includes at least one of the following: an RLC synchronization indication; a logical channel identifier where an RLC entity is located; a cell group identifier where an RLC entity is located; a state variable value of an RLC entity; a configurable parameter value of an RLC entity; a timer variable value of RLC; an RLC PDU which fails to transmit in an RLC sending buffer, corresponding to segment data of a PDCP PDU which fails to transmit; and an RLC PDU in an RLC receiving buffer.

In an embodiment, the method further includes that: after the retransmission network element completes RLC entity synchronization, the retransmission network element retransmits an RLC PDU which fails to transmit in an RLC sending buffer in the synchronized RLC entity to the terminal. The RLC PDU which fails to transmit includes the segment data of the PDCP PDU which fails to transmit.

The embodiments of the present disclosure provide specific examples for the content defined and encapsulated in the above-described messages (e.g., the first message, the second message, and the second retransmission indication message in the first retransmission indication message), in order to better understand the technical solutions described in the present embodiments.

First Message

A GTP-U PDU extension header structure may be newly defined, or one or more of the following Information Elements (IEs) newly defined in the present disclosure may be included in a GTP-U extension header structure of an existing downlink data delivery status.

In addition, an RLC PDU corresponding to segment data of a PDCP PDU which fails to transmit may be encapsulated in a GTP-U data field.

Table 1 is a header structure IE definition for a first message according to an embodiment of the present disclosure, as shown in Table 1:

TABLE 1

PDCP SN (indicating that the PDCP PDU is unsuccessfully transmitted)
PDCP S (segment retransmission indication)
RLC PDU SN (indicating an SN allocated to the PDCP PDU at a logical channel of an original node)
LOGICAL CHANNEL ID (indicating a logical channel identifier where the PDCP PDU is transmitted at the original node)
CELL GROUP ID (indicating a cell group identifier of a logical channel where the PDCP PDU is transmitted at the original node)
Undelivered segment Number (number of segments unsuccessfully delivered, N)
SO start (first block) (start bit position of the first segment unsuccessfully delivered)
SO end (first block) (end bit position of the first segment unsuccessfully delivered)
. . . (bit positions of N segments unsuccessfully delivered)
SO start (last block) (start bit position of the last segment unsuccessfully delivered)
SO end (last block) (end bit position of the last segment unsuccessfully delivered)

It is to be noted that SO is an abbreviation for "segment offset". It should be understood that the first message may also be encapsulated in a header structure definition and data field definition of any other transport layer protocol, such as SCTP, and not just a GTP-U protocol.

Second Message

A GTP-U PDU extension header structure may be newly defined, or one or more of the following IEs newly defined in the present disclosure may be included.

In addition, an RLC PDU which fails to transmit in an RLC sending buffer, corresponding to segment data of a PDCP PDU which fails to transmit, and an RLC PDU in an RLC receiving buffer may be encapsulated in a GTP-U data field.

Table 2 is a header structure IE definition for a second message according to an embodiment of the present disclosure, as shown in Table 2:

TABLE 2

RLC parameter Container (encapsulating RLC entity related parameters)
RLC SYNC indication (RLC synchronization indication)
LOGICAL CHANNEL ID (logical channel identifier where an RLC entity to be synchronized is located)
CELL GROUP ID (cell group identifier of a logical channel corresponding to the RLC entity to be synchronized)
RLC Buffer Indication (transmission or receive) (used for indicating whether an RLC PDU encapsulated by a data field belongs to an RLC sending buffer or receiving buffer)

It should be understood that the second message may also be encapsulated in a header structure definition and data field definition of any other transport layer protocol, such as SCTP, and not just a GTP-U protocol.

RLC entity related parameters include, but are not limited to: current values of state variables of an RLC entity; configurable parameters of the RLC entity; current values of timer variables of RLC; and a window size value of RLC.

Second Retransmission Indication Message

A GTP-U PDU extension header structure may be newly defined, or one or more of the following IEs newly defined in the present disclosure may be included in a GTP-U extension header structure of existing downlink user data.

In addition, an RLC PDU corresponding to segment data of a PDCP PDU which fails to transmit or the PDCP PDU which fails to transmit may be encapsulated in a GTP-U data field.

Table 3 is a header structure IE definition for a second retransmission indication message according to an embodiment of the present disclosure, as shown in Table 3:

TABLE 3

PDCP SN (indicating that the PDCP PDU is unsuccessfully transmitted)
PDCP S (segment retransmission indication)
RLC PDU SN (indicating an SN allocated to the PDCP PDU at a logical channel of an original node)
LOGICAL CHANNEL ID (indicating a logical channel identifier where the PDCP PDU is transmitted at the original node)
CELL GROUP ID (indicating a cell group identifier of a logical channel where the PDCP PDU is transmitted at the original node)
Undelivered segment Number (number of segments unsuccessfully delivered, N)
SO start (first block) (start bit position of the first segment unsuccessfully delivered)
SO end (first block) (end bit position of the first segment unsuccessfully delivered)
. . . (bit positions of N segments unsuccessfully delivered)
SO start (last block) (start bit position of the last segment unsuccessfully delivered)
SO end (last block) (end bit position of the last segment unsuccessfully delivered)

It should be understood that the second retransmission indication message may also be encapsulated in a header structure definition and data field definition of any other transport layer protocol, such as SCTP, and not just a GTP-U protocol.

Format-Specified Data

As follows, a GTP-U PDU extension header structure may be newly defined, the extension header structure including one or more of the following IEs newly defined in the present disclosure.

In addition, an RLC PDU may be encapsulated in a GTP-U data field.

Table 4 is a header structure IE definition for format-specified data according to an embodiment of the present disclosure, as shown in Table 4:

TABLE 4

RLC PDU SN (indicating an SN of the RLC PDU)
LOGICAL CHANNEL ID (indicating an original network element logical channel where the RLC PDU is located)
CELL GROUP ID (indicating a cell group identifier of the original network element logical channel where the RLC PDU is located)

It should be understood that the format-specified data may also be encapsulated in a header structure definition and data field definition of any other transport layer protocol, not just a GTP-U protocol.

Format RLC PDU

IEs associated with the format RLC PDU of the present disclosure may be added in existing RLC PDU formats.

Table 5 is an IE definition for a format RLC PDU according to an embodiment of the present disclosure, as shown in Table 5:

TABLE 5

| D/C | P | SI | R |
|---|---|---|---|

OLD LCID (indicating a logical channel ID where an original network element transmits the data, newly added IE)
OLD CELL GROUP ID (indicating a cell group identifier of a logical channel of the original network element, newly added IE)
OLD SN (indicating an RLC PDU SN allocated for transmission of the original network element, newly added TE)
SN
SO
Data (RLC PDU data which fails to transmit by the original network element)

In order to better understand the scheme described in the above embodiments, the following scenarios are also provided.

In scenario 1, retransmission of segment data of a PDCP PDU of a first network element (base station) is achieved through a second network element (base station).

Figure 5:
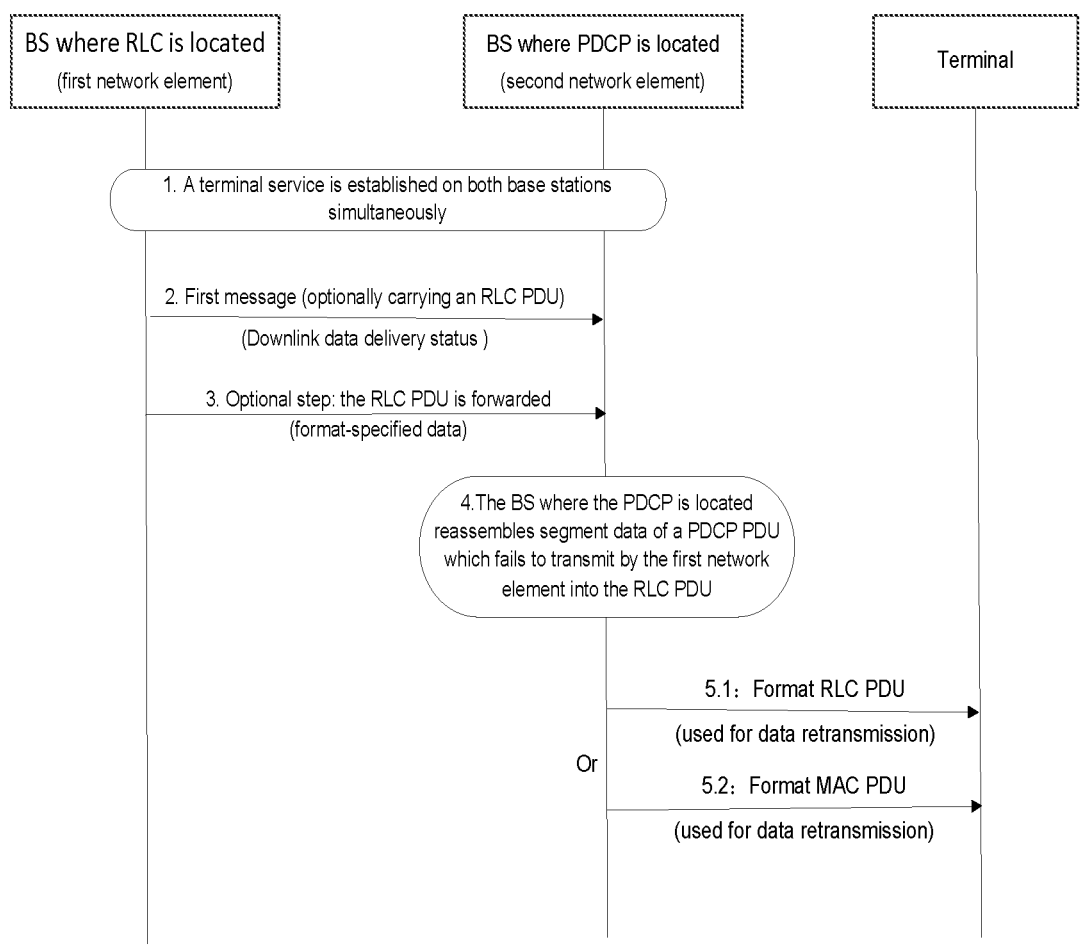
FIG. 5 is an interactive flowchart of scenario 1 of a data retransmission system according to an embodiment of the present disclosure.

FIG. 5 is an interactive flowchart of scenario 1 of a data retransmission system according to an embodiment of the present disclosure. As shown in FIG. 5, the flow includes steps 1 to 5 below.

In step 1, a terminal service is established on both base stations simultaneously.

In step 2, the first network element sends a first message to the second network element, the first message being used to indicate segment data of a PDCP PDU, which fails to transmit by the first network element. The first message may be a newly defined message or may follow an existing downlink data delivery status message encapsulating one or more of the following IEs: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit.

In step 3, in an embodiment, if the first network element receives a first retransmission indication response message sent by the second network element and returned for the first message, the first retransmission indication response message is used for indicating: the first retransmission indication message lacks the segment data of the PDCP PDU which fails to transmit or the segment data of the PDCP PDU which fails to transmit is incomplete, or if the first network element finds the lack of the segment data of the PDCP PDU which fails to transmit when self-checking, the first network element may encapsulate the RLC PDU which fails to transmit in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 4, the second network element may reassemble the segment data of the PDCP PDU which fails to transmit into an RLC PDU. The segment data of the PDCP PDU which fails to transmit may be acquired from the RLC PDU carried in the first message, or from the format-specified data, or may be acquired in combination with bit position information of the segment data of the PDCP PDU which fails to transmit, carried in the first message, and PDCP PDU data stored by the second network element and sent to the first network element.

In step 5, the second network element retransmits the reassembled RLC PDU to a terminal through a format RLC PDU, or retransmits the reassembled RLC PDU to the terminal through a format MAC PDU. In the sent format MAC PDU, an MAC header includes at least one of the following: an OLD LCID and an OLD cell group identifier. The OLD LCID is used to identify a logical channel identifier where the first network element transmits the data. The OLD cell group identifier is used to identify a cell group identifier where the first network element transmits the data. An MAC PDU data field is used to encapsulate RLC PDU data. In the sent format RLC PDU, an RLC header includes at least one of the following: an OLD LCID, an OLD RLC SN, and an OLD cell group identifier. The OLD LCID is used to identify a logical channel identifier where the first network element transmits the data. The OLD RLC SN is used to identify an RLC PDU SN allocated for the first network element to transmit the data. The OLD cell group identifier is used to identify a cell group identifier where the first network element transmits the data.

In scenario 2, retransmission of segment data of a PDCP PDU of a first network element (DU1) is achieved through a second network element (CU) and a third network element (DU2).

Figure 6:
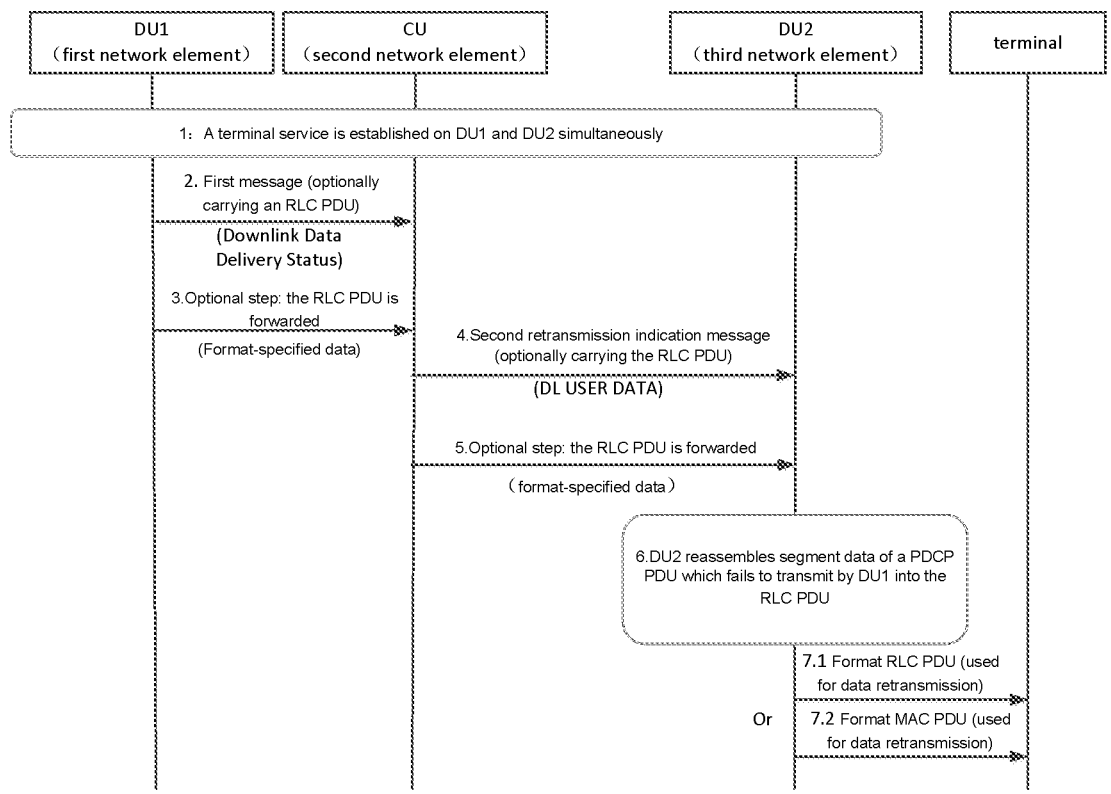
FIG. 6 is an interactive flowchart of scenario 2 of a data retransmission system according to an embodiment of the present disclosure.

FIG. 6 is an interactive flowchart of scenario 2 of a data retransmission system according to an embodiment of the present disclosure. As shown in FIG. 6, the flow includes steps 1 to 7 below.

In step 1, a terminal service is simultaneously borne on the first network element and the third network element.

In step 2, the first network element sends a first message to the second network element, the first message being used to indicate segment data of a PDCP PDU, which fails to transmit by the first network element. The first message may be a newly defined message or may follow an existing downlink data delivery status message encapsulating one or more of the following IEs: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit.

In step 3, in an embodiment, if the first message does not include specific segment data of the PDCP PDU which fails to transmit (i.e. RLC PDU which fails to transmit), the first network element may encapsulate the RLC PDU which fails to transmit in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 4, the second network element receives the first message and sends a second retransmission indication message to the third network element, the second retransmission indication message being used to indicate the segment data of the PDCP PDU which fails to transmit by the first network element. The second retransmission indication message may be a newly defined message or may follow an existing downlink user data message encapsulating one or more of the following IEs: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit or the PDCP PDU which fails to transmit.

In step 5, in an embodiment, if the second retransmission indication message does not include the RLC PDU which fails to transmit and the PDCP PDU which fails to transmit, the second network element may encapsulate the RLC PDU which fails to transmit in format-specified data of the present disclosure and send the data to the third network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 6, the third network element may reassemble the segment data of the PDCP PDU which fails to transmit into an RLC PDU. The segment data of the PDCP PDU which fails to transmit may be acquired from the RLC PDU carried in the second retransmission indication message, or from the format-specified data, or may be acquired in combination with bit position information of the segment data of the PDCP PDU which fails to transmit, carried in the second retransmission indication message, and PDCP PDU carried in the second retransmission indication message.

In step 7, the third network element retransmits the reassembled RLC PDU to a terminal through a format RLC PDU, or retransmits the reassembled RLC PDU to the terminal through a format MAC PDU. In the sent format MAC PDU, an MAC header includes at least one of the following: an OLD LCID and an OLD cell group identifier. The OLD LCID is used to identify a logical channel identifier where the first network element transmits the data. The OLD cell group identifier is used to identify a cell group identifier where the first network element transmits the data. An MAC PDU data field is used to encapsulate RLC PDU data. In the sent format RLC PDU, an RLC header includes at least one of the following: an OLD LCID, an OLD RLC SN, and an OLD cell group identifier. The OLD LCID is used to identify a logical channel identifier where the first network element transmits the data. The OLD RLC SN is used to identify an RLC PDU SN allocated for the first network element to transmit the data. The OLD cell group identifier is used to identify a cell group identifier where the first network element transmits the data.

In scenario 3, retransmission of segment data of a PDCP PDU of a first network element (DU1) is achieved through a second network element (CU) and a third network element (DU2).

Figure 7:
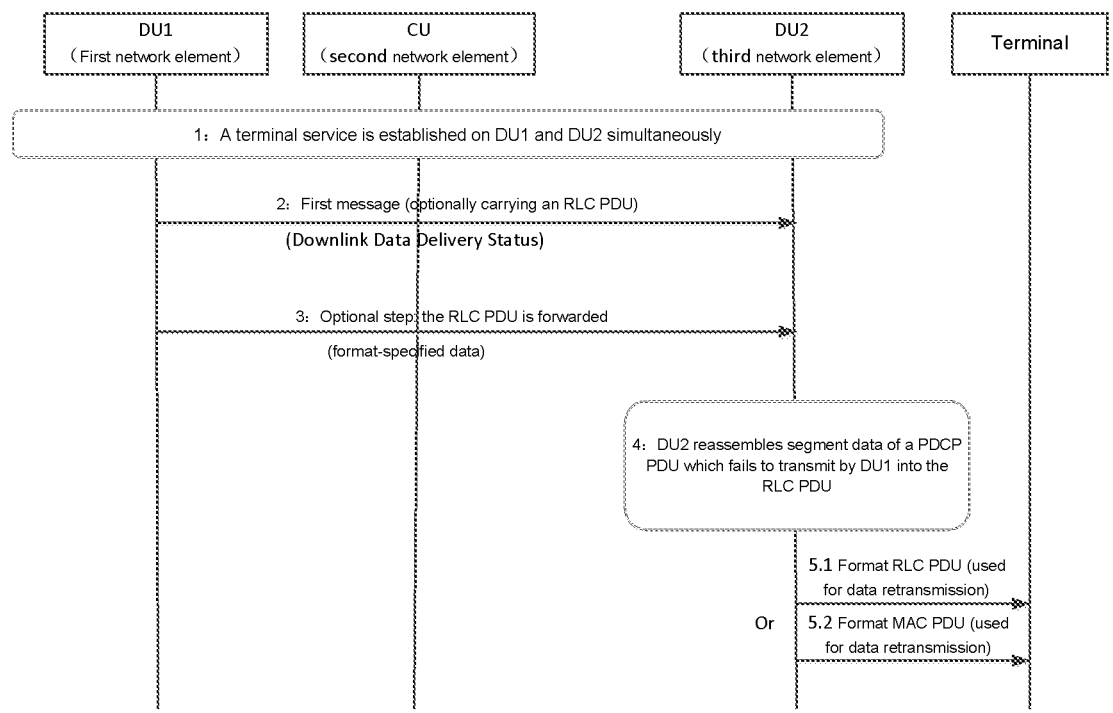
FIG. 7 is an interactive flowchart of scenario 3 of a data retransmission system according to an embodiment of the present disclosure.

FIG. 7 is an interactive flowchart of scenario 3 of a data retransmission system according to an embodiment of the present disclosure. As shown in FIG. 7, the flow includes steps 1 to 5 below.

In step 1, a terminal service is simultaneously borne on the first network element and the third network element.

In step 2, the first network element sends a first message to the third network element, the first message being used to indicate segment data of a PDCP PDU, which fails to transmit by the first network element. The first message may be a newly defined message or may follow an existing downlink data delivery status message encapsulating one or more of the following IEs: a PDCP segment retransmission indication; an SN of a PDCP PDU which fails to transmit; an RLC SN allocated to a PDCP PDU which fails to transmit in the transmission of the first network element; a logical channel identifier where a PDCP PDU which fails to transmit is located in the transmission of the first network element; a cell group identifier where a PDCP PDU which fails to transmit is located in the transmission of the first network element; bit position information for indicating one or more PDCP PDU segments which fail to transmit, the bit position information including: a start bit and an end bit of the PDCP PDU segment; and an RLC PDU corresponding to segment data of a PDCP PDU which fails to transmit.

In step 3, in an embodiment, if the first message does not include specific segment data of the PDCP PDU which fails to transmit (i.e. RLC PDU which fails to transmit), the first network element may encapsulate the RLC PDU which fails to transmit in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 4, the third network element reassembles the segment data of the PDCP PDU which fails to transmit into an RLC PDU. The segment data of the PDCP PDU which fails to transmit may be acquired from the RLC PDU carried in the first message, or from the format-specified data.

In step 5, the third network element retransmits the reassembled RLC PDU to a terminal through a format RLC PDU, or retransmits the reassembled RLC PDU to the terminal through a format MAC PDU. In the sent format MAC PDU, an MAC header includes at least one of the following: an OLD LCID and an OLD cell group identifier. The OLD LCID is used to identify a logical channel identifier where the first network element transmits the data. The OLD cell group identifier is used to identify a cell group identifier where the first network element transmits the data. An MAC PDU data field is used to encapsulate RLC PDU data. In the sent format RLC PDU, an RLC header includes at least one of the following: an OLD LCID, an OLD RLC SN, and an OLD cell group identifier. The OLD LCID is used to identify a logical channel identifier where the first network element transmits the data. The OLD RLC SN is used to identify an RLC PDU SN allocated for the first network element to transmit the data. The OLD cell group identifier is used to identify a cell group identifier where the first network element transmits the data.

In scenario 4, retransmission of segment data of a PDCP PDU of a first network element (DU1) is achieved through a second network element (CU) and a third network element (DU2).

Figure 8:
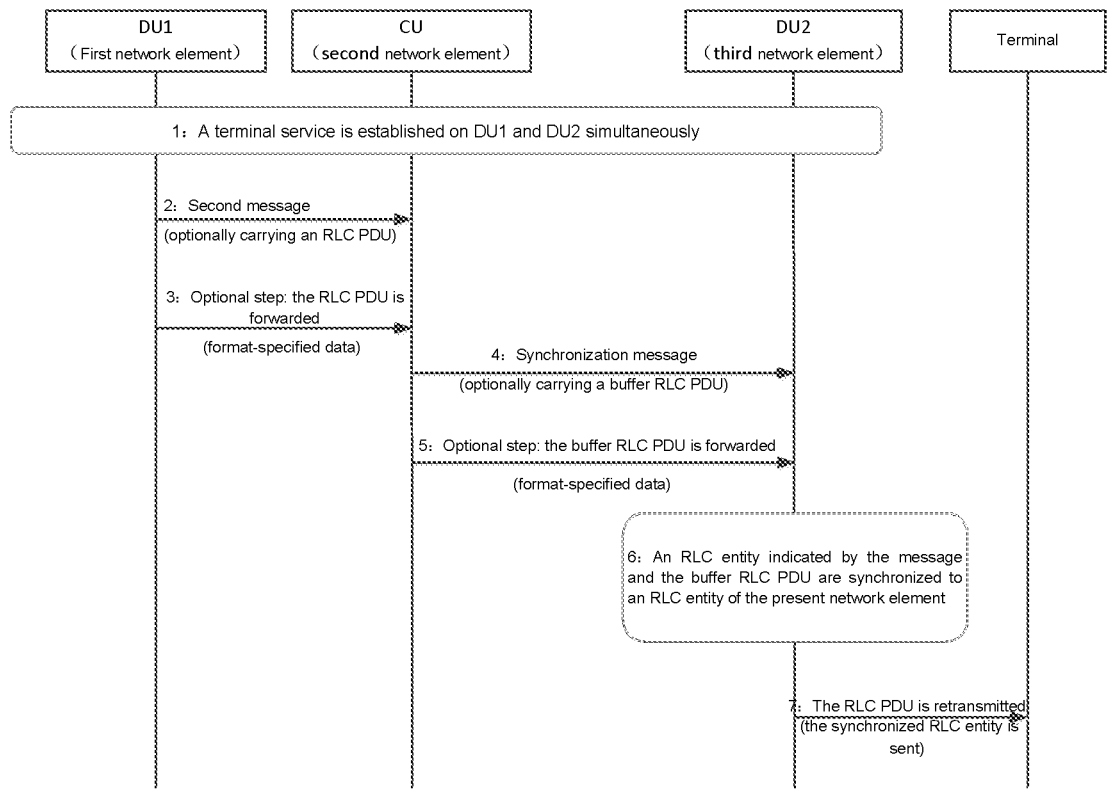
FIG. 8 is an interactive flowchart of scenario 4 of a data retransmission system according to an embodiment of the present disclosure.

FIG. 8 is an interactive flowchart of scenario 4 of a data retransmission system according to an embodiment of the present disclosure. As shown in FIG. 8, the flow includes steps 1 to 7 below.

In step 1, a terminal service is simultaneously borne on the first network element and the third network element.

In step 2, the first network element sends a second message to the second network element, the second message being used to indicate synchronization of an RLC entity. The second message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 3, in an embodiment, if the second message does not include RLC PDUs in a sending buffer and a receiving buffer of the RLC entity, the first network element may encapsulate the RLC PDUs in the sending buffer and the receiving buffer of the RLC entity in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 4, the second network element receives the second message and sends a synchronization message to the third network element, the synchronization message being used to indicate synchronization of an RLC entity. The synchronization message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 5, in an embodiment, if the second network element receives the format-specified data, the second network element forwards the format-specified data to the third network element.

In step 6, the third network element synchronizes the RLC entity indicated by the message and the RLC PDUs in the buffers to the local RLC entity.

In step 7, the third network element retransmits the synchronized RLC PDU which fails to transmit in the sending buffer of the RLC entity to the terminal, the RLC PDU which fails to transmit in the sending buffer being the segment data of the PDCP PDU which fails to transmit.

In scenario 5, retransmission of segment data of a PDCP PDU of a first network element (DU1) is achieved through a second network element (CU) and a third network element (DU2).

Figure 9:
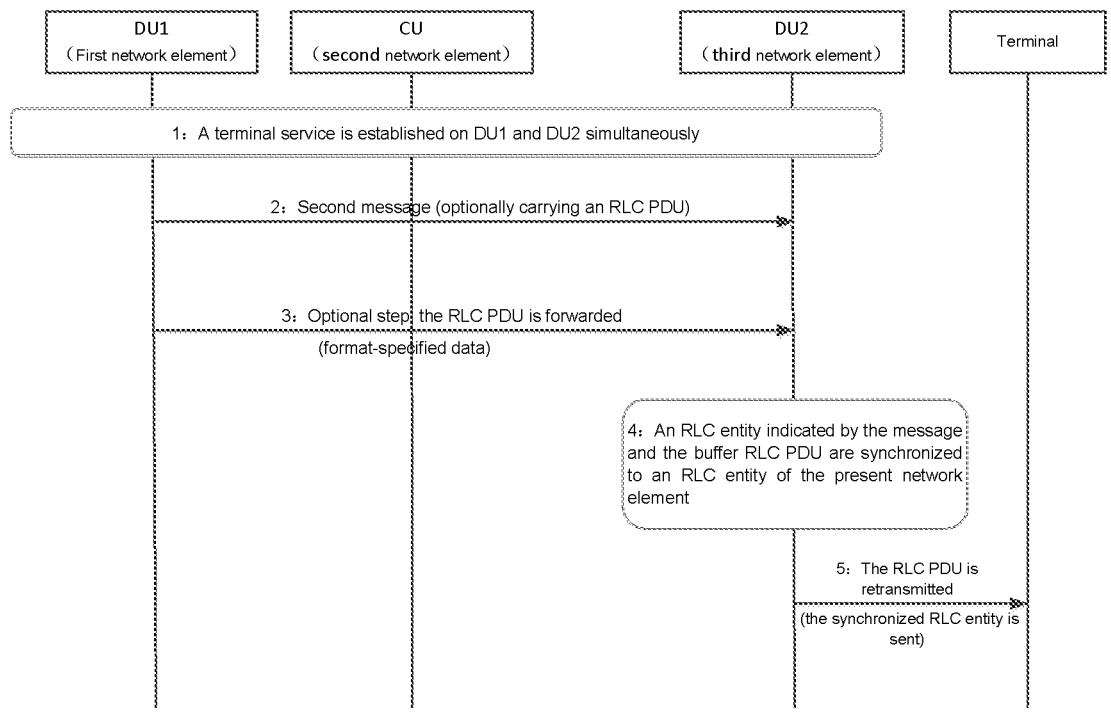
FIG. 9 is an interactive flowchart of scenario 5 of a data retransmission system according to an embodiment of the present disclosure.

FIG. 9 is an interactive flowchart of scenario 5 of a data retransmission system according to an embodiment of the present disclosure. As shown in FIG. 9, the flow includes steps 1 to 5 below.

In step 1, a terminal service is simultaneously borne on the first network element and the third network element.

In step 2, the first network element sends a second message to the third network element, the second message being used to indicate synchronization of an RLC entity. The second message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 3, in an embodiment, if the second message does not include RLC PDUs in a sending buffer and a receiving buffer of the RLC entity, the first network element may encapsulate the RLC PDUs in the sending buffer and the receiving buffer of the RLC entity in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 4, the third network element synchronizes the RLC entity indicated by the message and the RLC PDUs in the buffers to the local RLC entity.

In step 5, the third network element retransmits the synchronized RLC PDU which fails to transmit in the sending buffer of the RLC entity to the terminal, the RLC PDU which fails to transmit in the sending buffer being the segment data of the PDCP PDU which fails to transmit.

In scenario 6, retransmission of segment data of a PDCP PDU of a first network element (source DU) is achieved through a second network element (CU) and a third network element (target DU to be switched).

Figure 10:
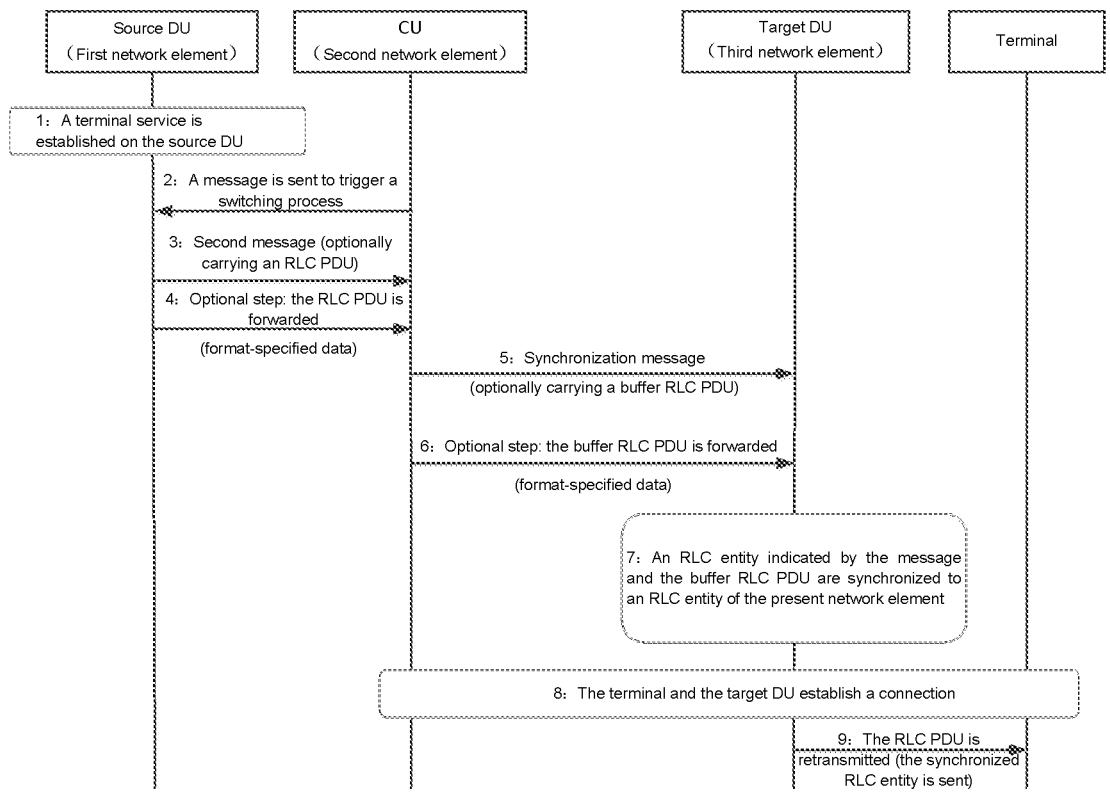
FIG. 10 is an interactive flowchart of scenario 6 of a data retransmission system according to an embodiment of the present disclosure.

FIG. 10 is an interactive flowchart of scenario 6 of a data retransmission system according to an embodiment of the present disclosure. As shown in FIG. 10, the flow includes steps 1 to 9 below.

In step 1, a terminal service is borne on the first network element.

In step 2, the second network element sends a message to the first network element, and triggers a switching process.

In step 3, the first network element sends a second message to the second network element, the second message being used to indicate synchronization of an RLC entity. The second message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 4, in an embodiment, if the second message does not include RLC PDUs in a sending buffer and a receiving buffer of the RLC entity, the first network element may encapsulate the RLC PDUs in the sending buffer and the receiving buffer of the RLC entity in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 5, the second network element receives the second message and sends a synchronization message to the third network element, the synchronization message being used to indicate synchronization of an RLC entity. The synchronization message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 6, in an embodiment, if the second network element receives the format-specified data, the second network element forwards the format-specified data to the third network element.

In step 7, the third network element synchronizes the RLC entity indicated by the message and the RLC PDUs in the buffers to the local RLC entity.

In step 8, the terminal and the third network element establish a connection.

In step 9, the third network element retransmits the synchronized RLC PDU which fails to transmit in the sending buffer of the RLC entity to the terminal, the RLC PDU which fails to transmit in the sending buffer being the segment data of the PDCP PDU which fails to transmit.

In scenario 7, retransmission of segment data of a PDCP PDU of a first network element (source DU) is achieved through a second network element (CU) and a third network element (target DU to be switched).

Figure 11:
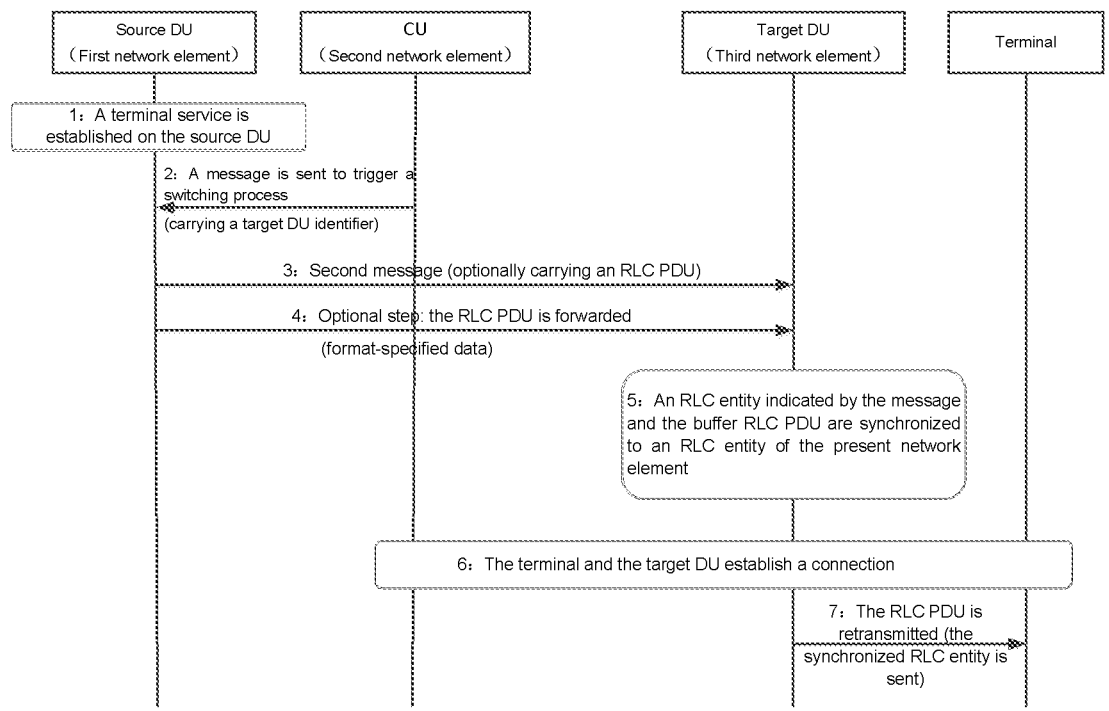
FIG. 11 is an interactive flowchart of scenario 7 of a data retransmission system according to an embodiment of the present disclosure.

FIG. 11 is an interactive flowchart of scenario 7 of a data retransmission system according to an embodiment of the present disclosure. As shown in FIG. 11, the flow includes steps 1 to 7 below.

In step 1, a terminal service is borne on the first network element.

In step 2, the second network element sends a message to the first network element, carries information of the third network element, and triggers a switching process.

In step 3, the first network element sends a second message to the third network element, the second message being used to indicate synchronization of an RLC entity. The second message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 4, in an embodiment, if the second message does not include RLC PDUs in a sending buffer and a receiving buffer of the RLC entity, the first network element may encapsulate the RLC PDUs in the sending buffer and the receiving buffer of the RLC entity in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 5, the third network element synchronizes the RLC entity indicated by the message and the RLC PDUs in the buffers to the local RLC entity.

In step 6, the terminal and the third network element establish a connection.

In step 7, the third network element retransmits the synchronized RLC PDU which fails to transmit in the sending buffer of the RLC entity to the terminal, the RLC PDU which fails to transmit in the sending buffer being the segment data of the PDCP PDU which fails to transmit.

In scenario 8, in the case of base station switching, retransmission of segment data of a PDCP PDU of the first network element (source base station) is achieved through the second network element (target base station).

Figure 12:
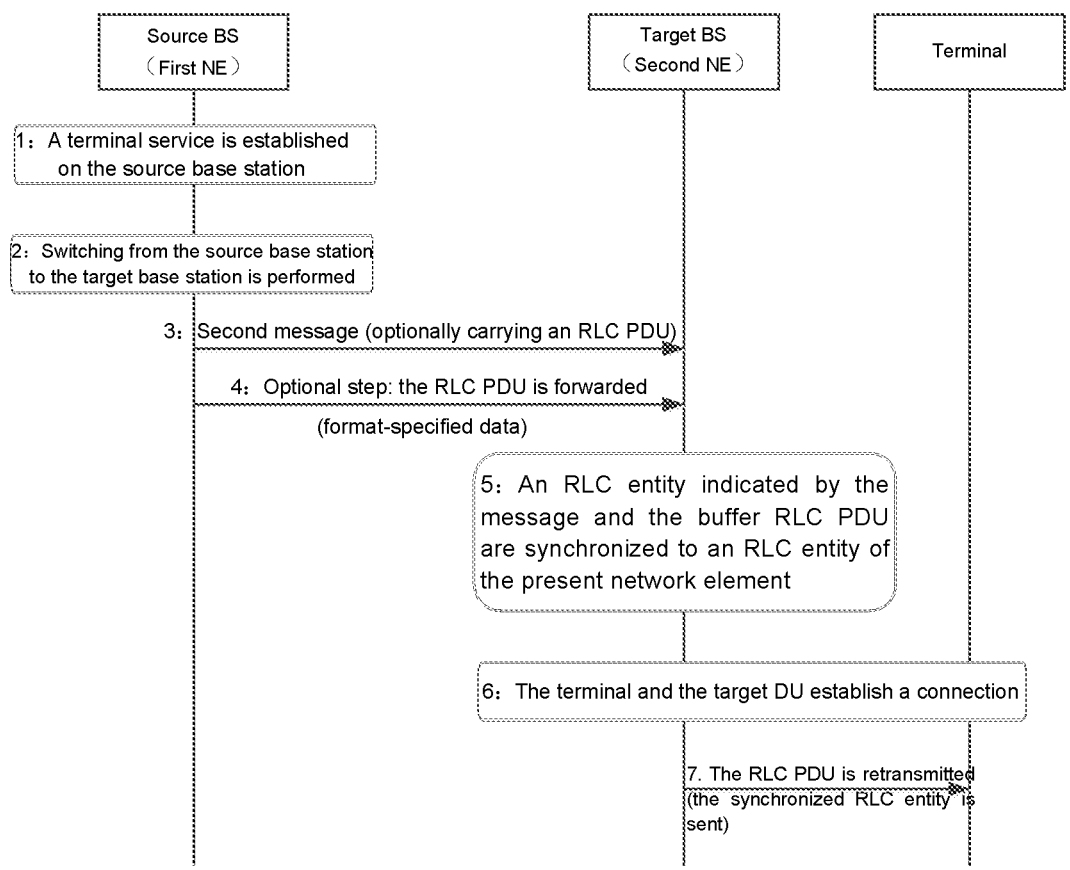
FIG. 12 is an interactive flowchart of scenario 8 of a data retransmission system according to an embodiment of the present disclosure.

FIG. 12 is an interactive flowchart of scenario 8 of a data retransmission system according to an embodiment of the present disclosure. As shown in FIG. 12, the flow includes steps 1 to 7 below.

In step 1, a terminal service bearer is established on the source base station.

In step 2, a network side switches from the source base station to the target base station.

In step 3, the first network element sends a second message to the second network element, the second message being used to indicate synchronization of an RLC entity. The second message encapsulates one or more of the following IEs: an RLC synchronization indication; a logical channel identifier where an RLC entity is located; a cell group identifier where an RLC entity is located; a state variable value of an RLC entity; a configurable parameter value of an RLC entity; a timer variable value of RLC; a window size value of RLC; an RLC PDU which fails to transmit in an RLC sending buffer, corresponding to segment data of a PDCP PDU which fails to transmit; and an RLC PDU in an RLC receiving buffer.

In step 4, in an embodiment, if the second message does not include RLC PDUs in a sending buffer and a receiving buffer of the RLC entity, the first network element may encapsulate the RLC PDUs in the sending buffer and the receiving buffer of the RLC entity in format-specified data of the present disclosure and send the data to the second network element. The format-specified data includes one or more of the following: a GTP-U extension header and a GTP-U data field. The GTP-U extension header includes at least one of the following: an RLC PDU SN; a logical channel identifier where the first network element transmits the RLC PDU; a cell group identifier where the first network element transmits the RLC PDU. The GTP-U data field is used to encapsulate the RLC PDU.

In step 5, the second network element synchronizes the RLC entity indicated by the message and the RLC PDUs in the buffers to the local RLC entity.

In step 6, the terminal and the target base station (second network element) establish a connection.

In step 7, the second network element retransmits the synchronized RLC PDU which fails to transmit in the sending buffer of the RLC entity to the terminal, the RLC PDU which fails to transmit in the sending buffer being the segment data of the PDCP PDU which fails to transmit.

The embodiments of the present disclosure also provide a data retransmission indication device, which is configured to implement the data retransmission indication method according to the present disclosure. The repeated description will be omitted. As used below, the term "module" may implement a combination of software and/or hardware of a predetermined function. Although the device described in the following embodiments is preferably implemented in software, hardware, or a combination of software and hardware, is also possible and contemplated.

Figure 13:
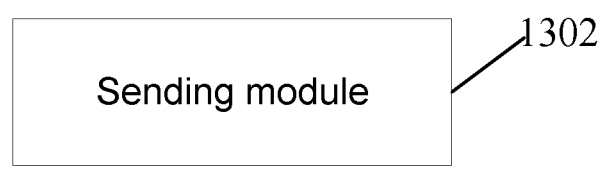
FIG. 13 is a structural block diagram of a data retransmission indication device according to an embodiment of the present disclosure.

FIG. 13 is a structural block diagram of a data retransmission indication device according to an embodiment of the present disclosure. As shown in FIG. 13, the device includes a sending module 1302.

The sending module 1302 is configured to send a retransmission indication message to a retransmission network element, the retransmission indication message being used to instruct the retransmission network element to retransmit segment data of a PDCP PDU, which fails to transmit by the first network element, to a terminal.

It is to be noted that each of the above modules may be implemented by software or hardware. For the latter, it may be implemented by, but not limited to, the following manners that the above modules are all located in the same processor; or, the above modules are located in different processors in any combination form respectively.

The embodiments of the present disclosure also provide a data retransmission processing device, which is configured to implement the data retransmission processing method according to the present disclosure. The repeated description will be omitted. As used below, the term "module" may implement a combination of software and/or hardware of a predetermined function. Although the device described in the following embodiments is preferably implemented in software, hardware, or a combination of software and hardware, is also possible and contemplated.

Figure 14:
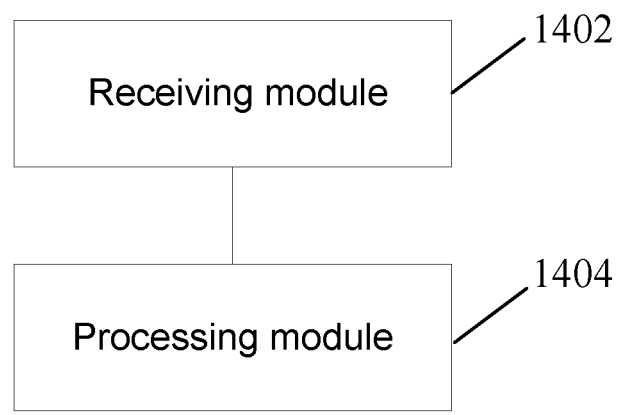
FIG. 14 is a structural block diagram of a data retransmission processing device according to an embodiment of the present disclosure.

FIG. 14 is a structural block diagram of a data retransmission processing device according to an embodiment of the present disclosure. As shown in FIG. 14, the device includes a receiving module 1402 and a processing module 1404.

The receiving module 1402 is configured to receive a retransmission indication message sent by a first network element.

The processing module 1404 is configured to retransmit segment data of a PDCP PDU, which fails to transmit by the first network element, to a terminal according to the retransmission indication message.

It is to be noted that each of the above modules may be implemented by software or hardware. For the latter, it may be implemented by, but not limited to, the following manners that the above modules are all located in the same processor; or, the above modules are located in different processors in any combination form respectively.

The embodiments of the present disclosure also provide a storage medium. The storage medium stores a computer program that, when run by a processor, causes the processor to perform the steps of the data retransmission indication method according to the present disclosure, or causes the processor to perform the steps of the data retransmission processing method according to the present disclosure.

In an embodiment, in the present embodiment, the storage medium may be configured to store a computer program for performing step S1.

In step S1, a first network element sends a retransmission indication message to a retransmission network element, the retransmission indication message being used to instruct the retransmission network element to retransmit segment data of a PDCP PDU, which fails to transmit by the first network element, to a terminal.

Alternatively, the storage medium may be configured to store a computer program for performing steps S1 and S2.

In step S1, a retransmission network element receives a retransmission indication message sent by a first network element.

In step S2, the retransmission network element retransmits segment data of a PDCP PDU, which fails to transmit by the first network element, to a terminal according to the retransmission indication message.

In an embodiment, in the present embodiment, the storage medium may include, but is not limited to, various media capable of storing a computer program such as a U disk, a ROM, a RAM, a mobile hard disk, a magnetic disk or an optical disc.

The embodiments of the present disclosure also provide an electronic device. The electronic device includes a memory and a processor. The memory stores a computer program. The processor is configured to run the computer program to perform the steps of the data retransmission indication method according to the present disclosure, or perform the steps of the data retransmission processing method according to the present disclosure.

In an embodiment, the electronic device may further include a transmission device and an input-output device. The transmission device is connected to the processor, and the input-output device is connected to the processor.

In an embodiment, in the present embodiment, the processor may be configured to use the computer program to perform step S1.

In step S1, a first network element sends a retransmission indication message to a retransmission network element, the retransmission indication message being used to instruct the retransmission network element to retransmit segment data of a PDCP PDU, which fails to transmit by the first network element, to a terminal.

Alternatively, the processor may be configured to use the computer program to perform steps S1 and S2.

In step S1, a retransmission network element receives a retransmission indication message sent by a first network element.

In step S2, the retransmission network element retransmits segment data of a PDCP PDU, which fails to transmit by the first network element, to a terminal according to the retransmission indication message.

In an embodiment, a specific example in the present embodiment may refer to the examples described in the above embodiments and alternative implementation manners, and details are not described herein in the present embodiment.

It is apparent that a person skilled in the art shall understand that all of the above-mentioned modules or steps in the present disclosure may be implemented by using a general calculation device, may be centralized on a single calculation device or may be distributed on a network composed of multiple calculation devices. In an embodiment, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to the combination of any specific hardware and software.

Through the present disclosure, when a network element fails to retransmit data, the network element instructs other network elements connected with the network element and capable of realizing retransmission of segment data of a PDCP PDU to retransmit the data, instead of retransmitting the data corresponding to the entire PDCP PDU, thereby not only solving the problem in the related art that RLC PDU data which has been successfully transmitted still needs to be retransmitted when a node where a PDCP is located retransmits the data, or, the problem of redundant retransmission of RLC PDU data that has been successfully transmitted due to retransmission of the entire PDCP PDU when a partial segment has been successfully transmitted to a terminal for a certain retransmitted PDCP PDU. Therefore, the beneficial effects of flexibly retransmitting PDCP PDU data and saving resources are achieved.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A data retransmission indication method, comprising, sending, by a first network element, a retransmission indication message to a retransmission network element, the retransmission indication message being used to instruct the retransmission network element to retransmit segment data of a Packet Data Convergence Protocol (PDCP) Protocol Data Unit (PDU), wherein the first network element has failed to transmit the segment data to a terminal, when receiving a first retransmission indication response message returned by the retransmission network element, encapsulating, by the first network element, Radio Link Control (RLC) PDU data corresponding to segment data of a PDCP PDU which has been failed to transmit into format-specified data, and sending the data to the retransmission network element; or, when receiving a first retransmission indication response message returned by the retransmission network element, encapsulating, by the first network element, RLC PDU data in a sending buffer and a receiving buffer in an RLC entity into format-specified data, and sending the data to the retransmission network element, wherein the first retransmission indication response message is used to indicate that the first retransmission indication message lacks the segment data of the PDCP PDU which has been failed to transmit or the segment data of the PDCP PDU which has been failed to transmit is incomplete.

2. He method according to claim 1, wherein the retransmission network element comprises at least one of the following: a second network element, and a third network element;
   wherein the first network element and the third network element are Distributed Units (DUs) or base stations where Radio Link Control (RLC) entities are located, and the second network element is a Central Unit (CU) or a base station where a PDCP entity is located.

3. He method according to claim 2, wherein the retransmission indication message comprises:
   a first retransmission indication message, used to instruct the second network element or the third network element to retransmit the segment data of the PDCP PDU, wherein the first network element has failed to transmit the segment data to a terminal.

4. He method according to claim 3, wherein the first retransmission indication message comprises: a first message, which comprises at least one of the following:
   a PDCP segment retransmission indication;
   a Sequence Number (SN) of a PDCP PDU which has been failed to transmit;
   an RLC SN allocated to a PDCP PDU which has been failed to transmit in the transmission of the first network element;
   a logical channel identifier where a PDCP PDU which has been failed to transmit is located in the transmission of the first network element;
   a cell group identifier where a PDCP PDU which has been failed to transmit is located in the transmission of the first network element;
   bit position information for indicating one or more PDCP PDU segments which have been failed to transmit, the bit position information comprising: a start bit and an end bit of the PDCP PDU segment; and
   an RLC PDU corresponding to segment data of a PDCP PDU which has been failed to transmit;
   or, wherein the first retransmission indication message comprises: a second message, which is used to indicate an RLC entity state of the first network element and comprises at least one of the following:
   an RLC synchronization indication;
   a logical channel identifier where an RLC entity is located;
   a cell group identifier where an RLC entity is located;
   a state variable value of an RLC entity;
   a configurable parameter value of an RLC entity;
   a timer variable value of RLC;
   a window size value of RLC;
   an RLC PDU which has been failed to transmit in an RLC sending buffer, corresponding to segment data of a PDCP PDU which has been failed to transmit; and
   an RLC PDU in an RLC receiving buffer.

5. He method according to claim 4, further comprising:
   when the first network element detects that the first retransmission indication message lacks the segment data of the PDCP PDU which has been failed to transmit, encapsulating, by the first network element, RLC PDU data corresponding to the segment data of the PDCP PDU which has been failed to transmit into format-specified data, and sending the data to the retransmission network element; or,
   when the first network element detects that the first retransmission indication message lacks the segment data of the PDCP PDU which has been failed to transmit, encapsulating, by the first network element, RLC PDU data in a sending buffer and a receiving buffer in an RLC entity into format-specified data, and sending the data to the retransmission network element.

6. The method according to claim 5, wherein the format-specified data at least comprises: a GTP-U extension header and a GTP-U data field, the GTP-U extension header comprises at least one of the following: an RLC PDU SN, a logical channel identifier where the first network element transmits the RLC PDU, a cell group identifier where the first network element transmits the RLC PDU; and the GTP-U data field is used to encapsulate the RLC PDU.

7. A data retransmission processing method, comprising:
receiving, by a retransmission network element, a retransmission indication message sent by a first network element; and retransmitting, by the retransmission network element, segment data of a Packet Data Convergence Protocol (PDCP) Protocol Data Unit (PDU), wherein the first network element has failed to transmit the segment data to a terminal according to the retransmission indication message, the method further comprises: after the retransmission network element returns a first retransmission indication response message to the first network element, receiving, by the retransmission network element, format-specified data sent by the first network element, wherein the format-specified data is encapsulated with: Radio Link Control (RLC) PDU data corresponding to segment data of a PDCP PDU which has been failed to transmit; or, RLC PDU data in a sending buffer and a receiving buffer in an RLC entity, and the first retransmission indication response message is used to indicate that the first retransmission indication message lacks the segment data of the PDCP PDU which has been failed to transmit or the segment data of the PDCP PDU which has been failed to transmit is incomplete.

8. He method according to claim 7, wherein the retransmission network element comprises at least one of the following: a second network element and a third network element,
   the first network element and the third network element are Distributed Units (DUs) or base stations where Radio Link Control (RLC) entities are located, and the second network element is a Central Unit (CU) or a base station where a PDCP entity is located.

9. He method according to claim 8, wherein the retransmission indication message comprises:
   a first retransmission indication message, used to instruct the second network element or the third network element to retransmit the segment data of the PDCP PDU, which has been failed to transmit by the first network element, to the terminal; or,
   a second retransmission indication message, used to instruct the second network element to retransmit the segment data of the PDCP PDU to the terminal through the third network element.

10. He method according to claim 9, wherein the first retransmission indication message comprises: a first message, which comprises at least one of the following:
   a PDCP segment retransmission indication;
   a Sequence Number (SN) of a PDCP PDU which has been failed to transmit;
   an RLC SN allocated to a PDCP PDU which has been failed to transmit in the transmission of the first network element;
   a logical channel identifier where a PDCP PDU which has been failed to transmit is located in the transmission of the first network element;
   a cell group identifier where a PDCP PDU which has been failed to transmit is located in the transmission of the first network element;
   bit position information for indicating one or more PDCP PDU segments which have been failed to transmit, the bit position information comprising: a start bit and an end bit of the PDCP PDU segment; and
   an RLC PDU corresponding to segment data of a PDCP PDU which has been failed to transmit;
   or, wherein the first retransmission indication message comprises: a second message, which is used to indicate an RLC entity state of the first network element and comprises at least one of the following:
   an RLC synchronization indication;
   a logical channel identifier where an RLC entity is located;
   a cell group identifier where an RLC entity is located;
   a state variable value of an RLC entity;
   a configurable parameter value of an RLC entity;
   a timer variable value of RLC;
   a window size value of RLC;
   an RLC PDU which has been failed to transmit in an RLC sending buffer, corresponding to segment data of a PDCP PDU which has been failed to transmit; and
   an RLC PDU in an RLC receiving buffer;
   or, wherein the second retransmission indication message comprises at least one of the following:
   a PDCP segment retransmission indication;
   an SN of a PDCP PDU which has been failed to transmit;
   an RLC SN allocated to a PDCP PDU which has been failed to transmit in the transmission of the first network element;
   a logical channel identifier where a PDCP PDU which has been failed to transmit is located in the transmission of the first network element;
   a cell group identifier where a PDCP PDU which has been failed to transmit is located in the transmission of the first network element;
   bit position information for indicating one or more PDCP PDU segments which have been failed to transmit, the bit position information comprising: a start bit and an end bit of the PDCP PDU segment; and
   an RLC PDU corresponding to segment data of a PDCP PDU which has been failed to transmit or the PDCP PDU which has been failed to transmit;
   or, the method further comprises:
   receiving, by the retransmission network element, a detection message and format-specified data sent by the first network element,
   wherein the detection message is used to indicate that the first retransmission indication message lacks the segment data of the PDCP PDU which has been failed to transmit, and the format-specified data is encapsulated with: RLC PDU data corresponding to segment data of a PDCP PDU which has been failed to transmit; or, RLC PDU data in a sending buffer and a receiving buffer in an RLC entity;
   or, the method further comprises:
   when receiving a second retransmission indication response message returned by the third network element, sending, by the second network element, the first retransmission indication message to the third network element; or,
   when receiving a second retransmission indication response message returned by the third network element, encapsulating, by the second network element, RLC PDU data corresponding to segment data of a PDCP PDU which has been failed to transmit into format-specified data, and sending the data to the third network element; or,
   when receiving a second retransmission indication response message returned by the third network element, encapsulating, by the second network element, RLC PDU data in a sending buffer and a receiving buffer in an RLC entity into format-specified data, and sending the data to the third network element,
   wherein the second retransmission indication response message is used to indicate that the second retransmission indication message lacks the segment data of the PDCP PDU which has been failed to transmit or the segment data of the PDCP PDU which has been failed to transmit is incomplete;
   or, the method further comprises:
   when detecting that the second retransmission indication message lacks the segment data of the PDCP PDU which has been failed to transmit, sending, by the second network element, the first retransmission indication message to the third network element; or, when detecting that the second retransmission indication message lacks the segment data of the PDCP PDU which has been failed to transmit, encapsulating, by the second network element, RLC PDU data corresponding to the segment data of the PDCP PDU which has been failed to transmit into format-specified data, and sending the data to the third network element; or, when detecting that the second retransmission indication message lacks the segment data of the PDCP PDU which has been failed to transmit, encapsulating, by the second network element, RLC PDU data in a sending buffer and a receiving buffer in an RLC entity into format-specified data, and sending the data to the third network element;

or, wherein when receiving the second retransmission indication message and format-specified data, the retransmission network element retransmits the segment data of the PDCP PDU to the terminal through the third network element by using the second retransmission indication message.

11. He method according to claim 10, wherein the format-specified data at least comprises: a GTP-U extension header and a GTP-U data field, the GTP-U extension header comprises at least one of the following: an RLC PDU SN; a logical channel identifier where the first network element transmits the RLC PDU; a cell group identifier where the first network element transmits the RLC PDU, and the GTP-U data field is used to encapsulate the RLC PDU.

12. The method according to claim 9, further comprising: when the retransmission network element has been failed to retransmit, performing, by the retransmission network element, segmentation and reassembly on the segment data of the PDCP PDU which has been failed to transmit to generate a format RLC PDU, and sending the format RLC PDU to the terminal.

13. He method according to claim 9, wherein an RLC header of the format RLC PDU comprises at least one of the following:

an OLD LCID, an OLD RLC SN, and an OLD cell group identifier, wherein the OLD LCID is used to identify a logical channel identifier where the first network element transmits the segment data of the PDCP PDU, the OLD RLC SN is used to identify an RLC PDU SN allocated for the first network element to transmit the segment data of the PDCP PDU, and the OLD cell group identifier is used to identify a cell group identifier of a logical channel where the first network element transmits the segment data of the PDCP PDU;

wherein the format RLC PDU is used to instruct an RLC entity in the terminal to forward the received RLC PDU to an RLC entity where a logical channel corresponding to the OLD LCID and/or the OLD cell group identifier in the RLC PDU header is located.

14. He method according to claim 9, wherein
when the third network element has been failed to retransmit, performing, by the second network element, segmentation and reassembly on the segment data of the PDCP PDU which has been failed to transmit to generate a format Media Access Control (MAC) PDU, and sending the format MAC PDU to the terminal.

15. He method according to claim 13, wherein an MAC header or MAC CE of the format MAC PDU comprises at least one of the following:

an OLD LCID and an OLD cell group identifier, wherein the OLD LCID is used to identify a logical channel identifier where the first network element transmits the segment data of the PDCP PDU, and the OLD cell group identifier is used to identify a cell group identifier of a logical channel where the first network element transmits the segment data of the PDCP PDU;

wherein the format MAC PDU is used to instruct the terminal to forward the received RLC PDU encapsulated in the MAC PDU to an RLC entity where a logical channel corresponding to the OLD LCID and/or the OLD cell group identifier in the MAC header or the MAC CE is located.

16. He method according to claim 10, further comprising:
when receiving the format-specified data, synchronizing, by the second network element, an RLC entity in the first network element to an RLC entity in the second network element according to the second message.

17. He method according to claim 10, further comprising:
when receiving the format-specified data, sending, by the second network element, a synchronization message to the third network element; and forwarding, by the second network element, the format-specified data to the third network element, wherein the synchronization message is used to instruct the third network element to synchronize the RLC entity of the first network element.

18. The method according to claim 17, wherein the synchronization message comprises at least one of the following:

an RLC synchronization indication;
a logical channel identifier where an RLC entity is located;
a cell group identifier where an RLC entity is located;
a state variable value of an RLC entity;
a configurable parameter value of an RLC entity;
a timer variable value of RLC;
an RLC PDU which has been failed to transmit in an RLC sending buffer, corresponding to segment data of a PDCP PDU which has been failed to transmit; and
an RLC PDU in an RLC receiving buffer;
or, the method further comprises:
after the retransmission network element completes RLC entity synchronization, retransmitting, by the retransmission network element, an RLC PDU which has been failed to transmit in an RLC sending buffer in the synchronized RLC entity to the terminal,
wherein the RLC PDU which has been failed to transmit comprises the segment data of the PDCP PDU which has been failed to transmit.

19. A data retransmission indication device, located in a first network element, the indication device comprising: a sending module, configured to send a retransmission indication message to a retransmission network element, the retransmission indication message being used to instruct the retransmission network element to retransmit segment data of a Packet Data Convergence Protocol (PDCP) Protocol Data Unit (PDU), wherein the first network element has failed to transmit the segment data to a terminal, wherein the first network element has failed to transmit the segment data to a terminal, when receiving a first retransmission indication response message returned by the retransmission network element, encapsulating, by the first network element, Radio Link Protocol (RLC) PDU data corresponding to segment data of a PDCP PDU which has been failed to transmit into format-specified data, and sending the data to the retransmission network element; or, when receiving a first retransmission indication response message returned by the retransmission network element, encapsulating, by the first network element, RLC PDU data in a sending buffer and a receiving buffer in an RLC entity into format-specified data, and sending the data to the retransmission network element, wherein the first retransmission indication response message is used to indicate that the first retransmission indication message lacks the segment data of the PDCP PDU which has been failed to transmit or the segment data of the PDCP PDU which has been failed to transmit is incomplete.

* * * * *